United States Patent

Dunn et al.

[11] Patent Number: 5,748,664
[45] Date of Patent: May 5, 1998

[54] SOLID STATE LASER WITH POSITIVE THERMAL LENS

[75] Inventors: Malcolm Harry Dunn; Wilson Sibbett; Peter Rahlff Christian, all of Farnborough; Bruce David Sinclair, St. Andrews; Michael Andrew Firth, Farnborough, all of United Kingdom

[73] Assignee: The Secretary of State for Defence in Her Britannic Majesty's Government of the United Kingdom of Great Britain and Northern Ireland, Hants, United Kingdom

[21] Appl. No.: 737,277
[22] PCT Filed: Apr. 24, 1995
[86] PCT No.: PCT/GB95/00916
  § 371 Date: Nov. 6, 1996
  § 102(e) Date: Nov. 6, 1996
[87] PCT Pub. No.: WO95/31022
  PCT Pub. Date: Nov. 16, 1995

[30] Foreign Application Priority Data

May 6, 1994 [GB] United Kingdom .................. 9409197

[51] Int. Cl.[6] .................................................. H01S 3/091
[52] U.S. Cl. .................. 372/75; 372/10; 372/39; 372/40; 372/43; 372/71
[58] Field of Search ........................ 372/10, 21, 22, 372/33, 34, 36, 39, 40, 70, 71, 75, 50, 43

[56] References Cited

U.S. PATENT DOCUMENTS

| | | | |
|---|---|---|---|
| 3,577,098 | 5/1971 | Winston | 372/33 X |
| 4,199,735 | 4/1980 | Chadwick et al. | 372/33 X |
| 4,713,820 | 12/1987 | Morris et al. | 372/41 |
| 4,730,324 | 3/1988 | Azad | 372/33 |
| 4,782,495 | 11/1988 | Azad | 372/99 |
| 4,912,713 | 3/1990 | Langhans | 372/66 |
| 5,181,214 | 1/1993 | Berger et al. | 372/34 |
| 5,235,610 | 8/1993 | Finch et al. | 372/92 |
| 5,325,390 | 6/1994 | Tidwell | 372/71 |
| 5,561,547 | 10/1996 | Keirstead et al. | 372/71 X |

FOREIGN PATENT DOCUMENTS

| | | | |
|---|---|---|---|
| 2241109 | 1/1991 | United Kingdom | 385/75 X |
| 2259603 | 4/1992 | United Kingdom | 385/75 X |

OTHER PUBLICATIONS

*Optics Letters*, vol. 16, No. 5, 1 Mar. 1991, New York, US, pp. 318–320, D.C. Shannon et al., "High Power Nd: YAG Laser End Pumped by a CW, 10 mm x 1 µm Aperture, 10–W Laser–Diode Bar".

*Optics Letters*, vol. 18, No. 2, 15 Jan. 1993, New York, US, pp. 116–118, S.C. Tidwell et al., "Highly Efficient 60–W TEMoo CW Diode–End–Pumped Nd:YAG Laser".

*IEEE Journal of Quantum Electronics*, vol. 26, No. 5, May 1990, New York, US, pp. 827–829, C. Pfistner et al., "Efficient Nd:YAG Slab Longitudinally Pumped by Diode Lasers".

*IEEE Journal of Quantum Electronics*, vol. 29, No. 6, Jun. 1993, New York, US, pp. 1515–1519, R. Scheps et al., "Efficient, Scalable, Internally Folded Nd:YAG Laser End-Pumped by Laser Diodes".

*Laser Focus World*, vol. 30, No. 6, Jun. 1994, Tulsa, US, pp. 20–22, Y.A. Carts, "Diode–Pumpted Slab Lasers Operate at High Frequencies".

*Primary Examiner*—Brian Healy
*Attorney, Agent, or Firm*—Nixon & Vanderhye P.C.

[57] ABSTRACT

An all-solid-state laser comprising a slab (1) of gain medium, a diode laser pump system (3) configured in an end pumping geometry with the gain medium (1) and a heat sink thermally contacted to the gain medium (1) wherein the diode laser pump system (3) and the gain medium (1) are cooperably arranged so that in use a positive thermal lens is capable of being formed within the medium, the gain medium (1) having a thickness (d–d') made as small as possible while permitting the substantially unhindered passage through the slab of the laser mode established between the two mirrors (M1, M2).

8 Claims, 2 Drawing Sheets

SOLID STATE LASER WITH POSITIVE THERMAL LENS

BACKGROUND OF THE INVENTION

1. Field of the Invention

This invention relates to a solid state laser particularly to the type pumped by a semiconductor diode laser. More particularly, but not exclusively, the invention relates to an end pumped solid state laser.

2. Discussion of Prior Art

The combination of a solid state gain medium pumped by a semiconductor diode laser shall hereinafter be referred to as an all-solid-state laser.

It is well established (e.g. D. C. Shannon and R. W. Wallace, Optics Letters, Volume 16, Number 5, pages 318 to 320, Mar. 1st 1994 S. C. Tidwell, J. F. Seamans and M. S. Bowers, Optics letters, Volume 18, Number 2 Pages 116 to 118, Jan. 15 1993) that there are a number of advantages in using end pumping schemes as compared to side pumping schemes when using diode lasers to pump solid state gain media. In particular these advantages result from the ability to deposit the pump energy into a smaller volume of the gain medium when using end pumping as opposed to side pumping schemes. These advantages are twofold, namely: firstly, for a given diode laser power (energy input) higher single pass gains are attained which has the benefit of making the optical resonator of the laser less susceptible to loss thereby leading to an improved external efficiency for the end pumped all-solid-state laser; secondly, a better overlap between the volume of the gain medium that is optically pumped by the diode laser and the cavity mode of the all-solid-state laser is attained thereby improving the slope efficiency as compared with the side pumped all-solid-state laser.

Despite these advantages a number of difficulties are encountered in applying end pumping schemes to an all-solid-state laser, particularly these relate to thermal effects induced in the gain medium by the absorption of the diode laser pump energy and include thermally induced birefringence, thermally induced lensing and thermal fracture of the solid state gain medium. Such difficulties are more severe in the case of end pumping than in the case of side pumping because of the smaller volume in which the pump energy is absorbed in the former compared with the latter case.

SUMMARY OF THE INVENTION

According to the present invention there is provided an all-solid-state laser comprising a slab of gain medium (1), a diode laser pump system (3) configured in an end pumping geometry with the gain medium and a heat sink thermally contacted to the gain medium characterised in that the gain medium exhibits a negative bulk thermal lensing effect and that the diode laser pump system and the gain medium are cooperably arranged so that in use a positive thermal lens is capable of being formed at the surface of the gain medium and is such that the negative bulk thermal lensing effect within the gain medium is overwhelmed, and further characterised in that the gain medium has a thickness which is as small as possible while permitting the unhindered passage of a laser mode through the slab.

Nd:YLF is an example of a gain medium having a negative bulk thermal lensing effect but other such media which may be used in conjunction with this invention will be readily apparent to the skilled person. The use of a thin slab geometry of a gain medium of this type, has the advantage that the residual thermal energy remaining in the gain medium after extraction of the coherent optical output is better dissipated, so reducing the thermal loading in the medium. This permits the use of higher pump energies per unit volume of gain medium before reaching the limits of thermal fracture.

Additionally, the diode laser pump system and the gain medium are cooperably arranged so that in use a positive thermal lens is capable of being formed within the medium. In this configuration a surface dominated positive thermal lensing effect (converging lens behaviour) in the gain medium overwhelms any volume dominated negative thermal lensing effect (diverging lens behaviour) in the gain medium with the advantage that the resulting overall positive lensing effect present in the optical resonator improves the resonator stability and mode control.

The ratio of positive to negative lensing effects depends largely, but not exclusively, on the ratio of the area of the gain medium illuminated by the pump source to the penetration depth within the gain medium of the incident pump source. This ratio will of course vary with gain medium and pump source and may be established for a particular gain medium and pump source with reasonable trial and error by a person skilled in the art.

The gain medium may be placed in a standing wave or travelling wave (ring) resonator, the latter being capable of providing an enhancement to the single frequency laser oscillation mode of operation. The choice of resonator is dependant on the use to which the laser will be put.

Additionally, where it is desirable to have pulsed operation of the laser a means for producing a pulsed output, for example by using a Q-switch device, a gain switch device or by mode locking, may be included in the laser.

Furthermore, when employing a heat sink to aid in the dissipation of heat from the gain medium it is preferable that the heat sink is arranged to be in thermal contact with those faces of the gain medium on which neither the pump beam nor the laser beam produced by the gain medium is incident so that these beams can pass unhindered by the material used to establish the thermal contact.

BRIEF DESCRIPTION OF THE DRAWINGS

Embodiments of the invention will now be described by way of examples only with reference to the Figures, in which.

DETAILED DISCUSSION OF PREFERRED EMBODIMENT

Figure 1:
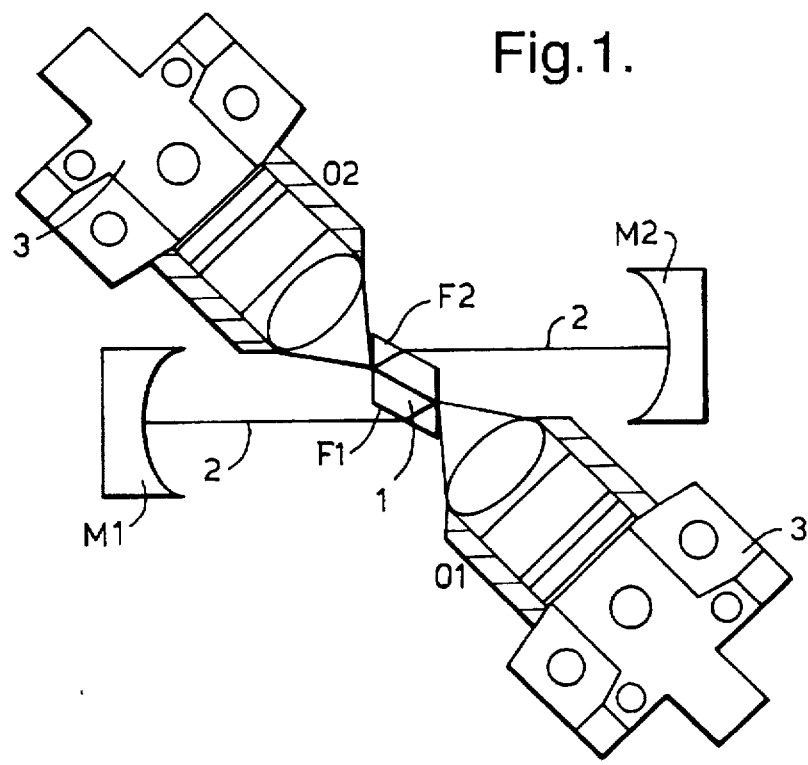
FIG. 1 shows a diagrammatical view of a continuous-wave (CW) version of the end pumped all-solid-state laser.
Figure 2:
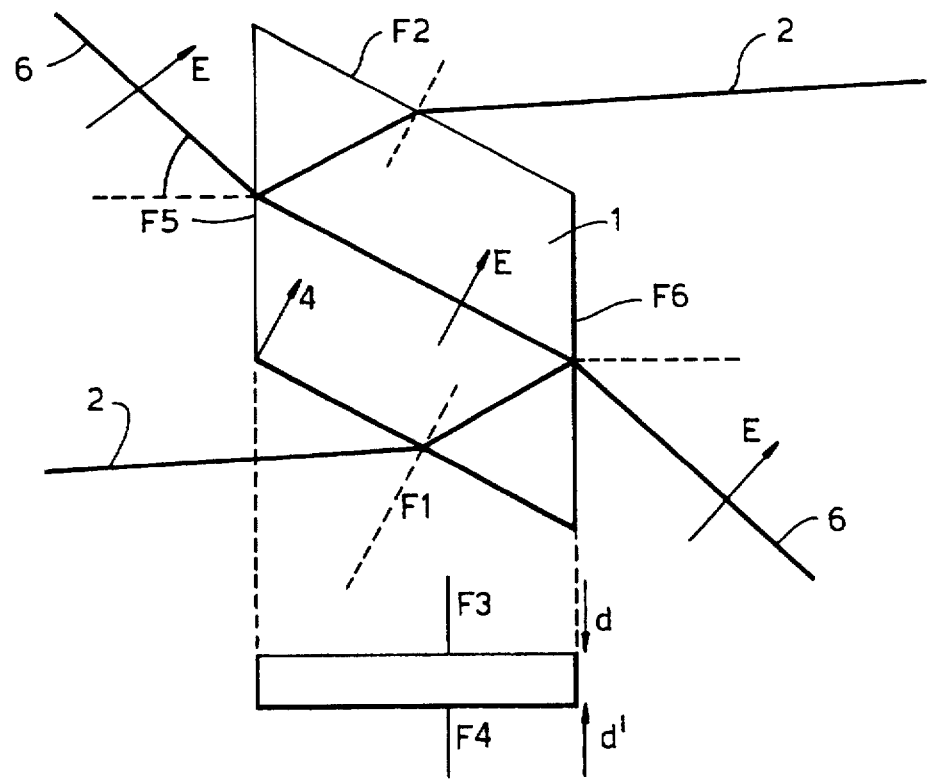
FIG. 2 shows a plan and end view of a lozenge-shaped slab of gain medium for use in an all-solid-state laser and the coherent light path through the slab.

The first embodiment of the invention is a continuous-wave version of an all-solid-state laser and is shown in FIG. 1. The solid state gain element of the laser is lozenge-shaped slab 1 shown in greater detail in FIG. 2, which shows both a plan view and an end elevation. The thickness of the slab, d–d', is reduced to a minimum (2 mm) subject to the constraint that it must be sufficiently large to allow uninterrupted (low aperture clipping loss) passage of the laser mode established between mirrors M1, M2 (FIG. 1). The mirrors, M1, M2, are so arranged as to define a standing wave cavity through the slab 1 by way of the faces F1, F2, with the coherent light beam of generated laser radiation 2 entering and exiting these faces at the Brewster angle. The gain element is heat-sinked onto a cooling block or blocks by way of its faces F3, F4 (shown in the end elevation of FIG. 2).

The gain medium used in this particular embodiment is Nd:YLF (doping level of Nd 1.1%), which is cut relative to its c-axis such that its c-axis is orientated in the direction of the arrow 4. The pump-beam 6 is applied to the gain element 1 through faces F5, F6 using a pair of diode lasers 3 of GaAlAs where matching optics O1, O2 are utilised in order to define the pumped region in the slab. Typical cross-section dimensions are 600 µm along the thickness of the slab by 1100 µm perpendicular to the thickness of the slab. The electric vectors of the pumping light 6 and coherent light generated by the laser 2 are in the direction E on FIG. 2. The faces F5, F6 are coated with a dichroic coating so as to reflect totally the coherent light generated within the laser cavity at the angle of incidence shown in FIG. 2, but to transmit the pumped light 6 so that it is absorbed within the slab which has a typical absorption depth of 5000 µm for 90% absorption (hence producing in this configuration a illumination area to penetration depth ratio which fulfils the requirement for positive thermal lensing)

Both theoretical modelling and experimental measurement confirm that minimisation of the dimension d–d' of the slab 1 minimises the thermal gradient established in the slab when it is subject to optical pumping by the diode lasers 3 in the geometry shown in FIG. 1. As a result high pump powers and energies per unit volume can be applied without exceeding the fracture limit of the slab material. Pump powers of 20 Watts per face F5, F6 have been routinely applied over extended periods without encountering slab failure. The further aspect of the invention which involves using the diode-laser based end-pumping geometry to induce on the surface of the gain medium a positive thermal lens/mirror has also been demonstrated. Despite the presence in Nd:YLF of a bulk (volume) negative thermal lensing effect due to the negative value for this material of the rate of change of refractive index with temperature, an overall positive thermal lensing has been demonstrated in which the surface dominated effect overwhelms the bulk effect. For example, with the pumping geometry described above, a positive thermal lens per diode-laser-pumped interface of +0.3 diopters/Watt has been measured consistently by a number of methods. In continuous-wave performance, output powers of the order of 6.5 Watts at 1047 nm are obtained for pump powers per interface of the order of 10 Watts (20 Watts in total) with corresponding slope efficiencies (rate of change of optical power out as a function of absorbed optical power in) of the order of 38%. The efficacy of the control of thermal lensing is confirmed by the observation of $M^2$-values of 1.6 at this pump level.

Figure 3:
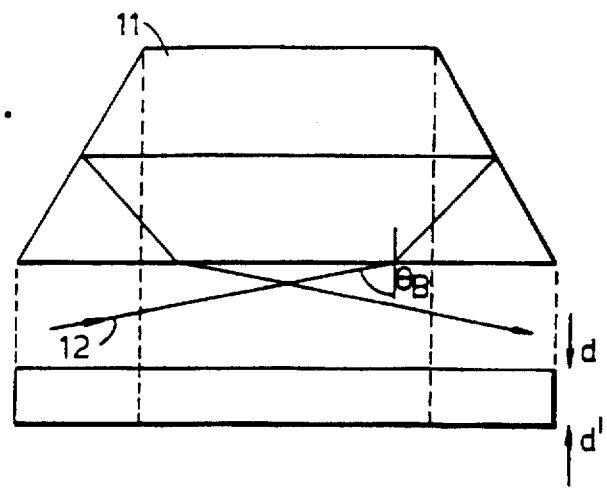
FIG. 3 shows a plan and end view of a prism-shaped slab of gain medium for use in an all-solid state laser and the coherent light path through the slab.
Figure 4:
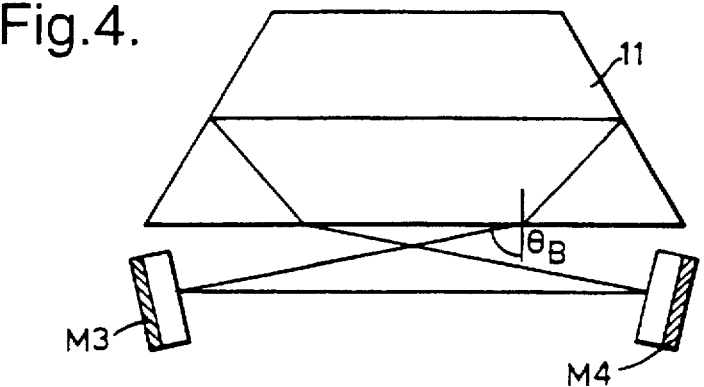
FIG. 4 shows the incorporation of a prism-shaped slab within a ring resonator.

A second embodiment of the invention is shown in FIG. 3, in which a slab of solid-state gain medium 11 has a prism geometry but is otherwise similar to the slab of the preceding embodiment. The slab again has a thickness d–d' of 2 mm. The contrasting manner in which the coherent laser radiation 12 enters and exits from the slab in this case as compared to the former case while still retaining an angle of incidence equal to the Brewster angle (the angle $\Theta_B$ as shown in FIG. 3) allows the slab to be used within a ring resonator in combination with a pair of mirrors M3, M4 as shown in FIG. 4. This can be operated in travelling-wave mode, hence avoiding spatial hole-burning which thereby leads to improved performance as a single frequency laser. As in the previous embodiment the invention provides both reduced thermal gradients thus offsetting thermal fracture, and positive thermal lensing thus stabilising the optical resonator.

Figure 5:
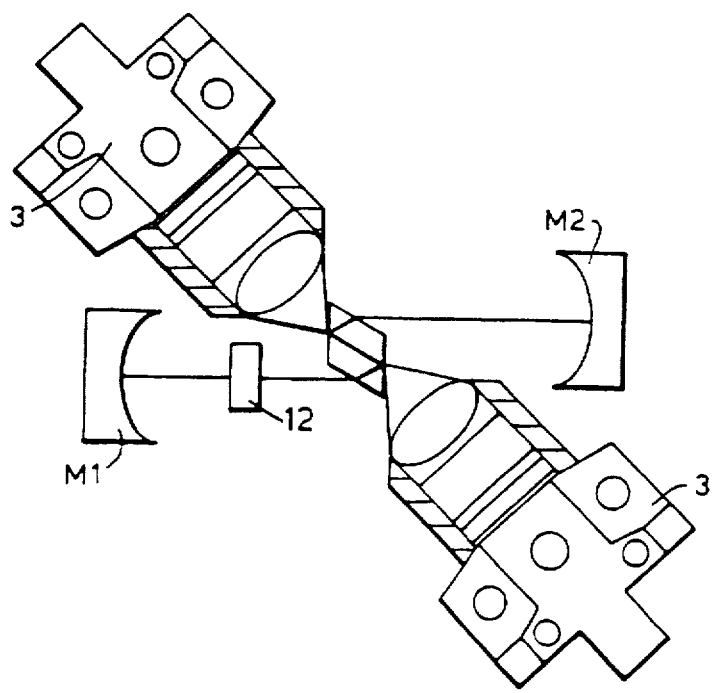
FIG. 5 shows the laser illustrated in FIG. 1 with a Q-switch incorporated within the laser resonator.

A third embodiment of the invention is illustrated in FIG. 5. This embodiment is similar to the first embodiment, and like numerals are used to designate like components. The embodiment differs in that the laser resonator now incorporates a Q-switch 12. When pumped by the diode lasers 3 at a total power of 20 Watts (10 Watts per interface) a Q-switched output power of 5 Watts mean power at 1047 nm is attained at a repetition rate of 6 KHz, corresponding to Q-switched pulses of 0.83 mJ energy and 25 ns duration. The high spatial quality of the output is reflected in an $M^2$-value of around 1.3, and is further confirmed by the experimental observation of external single-pass frequency-doubling efficiencies into the green at 523 nm of 55% using the non-linear material potassium titanyl phosphate, and of subsequent single-pass sum-frequency-mixing of the generated green radiation and the residual fundamental radiation in the non-linear material lithium triborate so as to generate ultraviolet radiation at 347 nm with an efficiency of 14% overall.

It will be appreciated that the above embodiments are described by way of example only, and modifications to them may be made without departing from the scope of the invention.

We claim:

1. An all-solid-state laser comprising:
   a slab of gain medium,
   a diode laser pump system configured in an end pumping geometry with the gain medium and a heat sink thermally contacted to the gain medium wherein the gain medium exhibits a negative bulk thermal lensing effect and that the diode laser pump system and the gain medium comprises a means for providing a positive thermal lens at the surface of the gain medium wherein the positive thermal lens overwhelms the negative bulk thermal lensing effect within the gain medium and the gain medium has a thickness which is as small as possible while permitting low clipping loss passage of a laser mode through the slab.

2. A laser as claimed in claim 1 wherein the gain medium is Nd:YLF.

3. A laser as claimed in claim 1 wherein the gain medium is lozenge shaped.

4. A laser as claimed in claim 3 and further comprising a standing wave resonator.

5. A laser as claimed in claim 1 wherein the gain medium is prism shaped.

6. A laser as claimed in claim 5 and further comprising a ring resonator.

7. A laser as claimed in claim 1 and further comprising a means for producing a pulsed output.

8. A laser as claimed in claim 7 wherein the means for producing a pulsed output comprises a Q-switch device.

* * * * *